US008863517B2

(12) United States Patent
Ba-abbad et al.

(10) Patent No.: US 8,863,517 B2
(45) Date of Patent: Oct. 21, 2014

(54) SOLAR STEAM GENERATOR

(75) Inventors: Mazen A. Ba-abbad, Riyadh (SA);
Hany A. Al-Ansary, Riyadh (SA);
Essam A. Al-Ammar, Riyadh (SA)

(73) Assignee: King Saud University, Riyadh (SA)

( * ) Notice: Subject to any disclaimer, the term of this patent is extended or adjusted under 35 U.S.C. 154(b) by 378 days.

(21) Appl. No.: 13/306,984

(22) Filed: Nov. 30, 2011

(65) Prior Publication Data
US 2013/0133323 A1    May 30, 2013

(51) Int. Cl.
*F03G 6/00* (2006.01)
*F24J 2/12* (2006.01)

(52) U.S. Cl.
USPC .......................... 60/641.15; 203/10; 126/694

(58) Field of Classification Search
USPC ............ 60/641.8–641.15; 203/10; 122/367.1, 122/4 R; 126/684, 694
See application file for complete search history.

(56) References Cited

U.S. PATENT DOCUMENTS

| 4,030,477 | A | * | 6/1977 | Smith | 126/695 |
| 4,363,703 | A | * | 12/1982 | ElDifrawi et al. | 203/10 |
| 4,399,368 | A | * | 8/1983 | Bucknam | 290/1 R |
| 5,120,661 | A | * | 6/1992 | Baker et al. | 436/164 |
| 2011/0284362 | A1 | * | 11/2011 | Ba-abbad et al. | 203/10 |
| 2012/0298499 | A1 | * | 11/2012 | Lee | 203/10 |
| 2013/0014710 | A1 | * | 1/2013 | Munson, Jr. | 122/367.1 |

* cited by examiner

*Primary Examiner* — Hoang Nguyen
(74) *Attorney, Agent, or Firm* — Lowe Hauptman & Ham, LLP

(57) ABSTRACT

Systems and methods for solar steam generation are described. The systems and methods include disposing a plug in a closed top outer shell of a solar steam generator, which may define a small annular space between the plug and an interior of a transparent housing disposed atop the outer shell. Raw water is transferred into the outer shell of the solar steam generator, up into the small annular space between the plug and the interior of the transparent housing. Concentrated solar energy is directed at the transparent housing to boil raw water in the small annular space. Stray concentrated solar energy may be focused at the transparent housing to aid in boiling raw water in the small annular space. Steam rising from the small annular space is directed through a cavity extending from a top of the plug, downward through a steam outlet pipe, out of the solar steam generator.

11 Claims, 6 Drawing Sheets

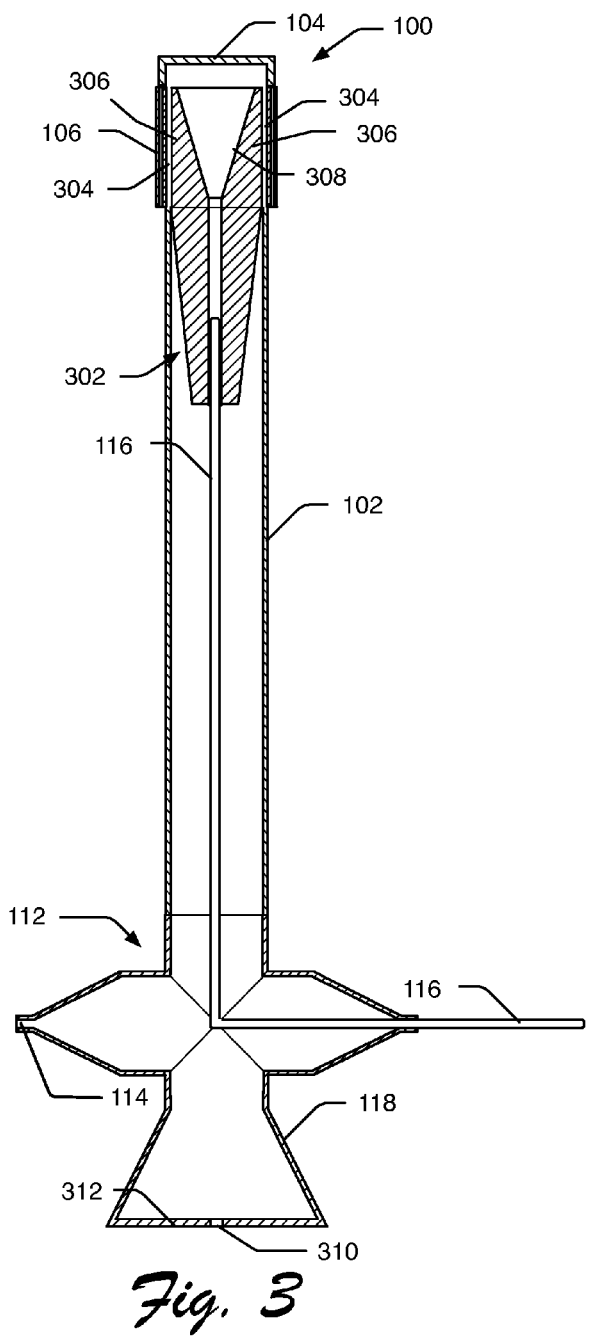
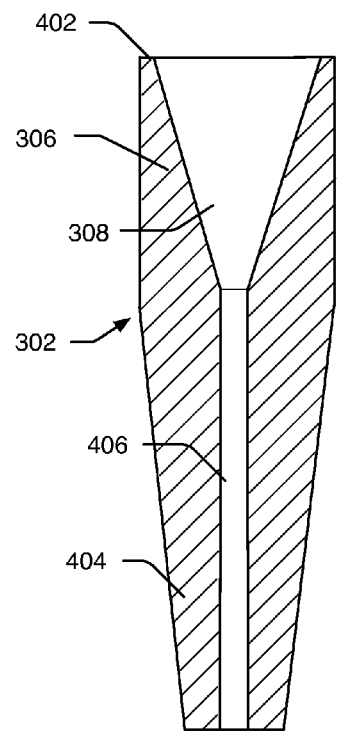
Fig. 3
Fig. 4

SOLAR STEAM GENERATOR

BACKGROUND

Conventional water desalination and/or purification systems require considerable amounts of energy and/or equipment. Existing solar stills are generally inefficient. Such systems also typically produce concentrated brine discharges that can harm the environment. Most existing steam condensers allow cooling water to evaporate and low salinity water is continuously added to the system, which exhausts water resources. Similarly, existing systems and methods for generation of steam using concentrated solar energy generally employ complicated and expensive equipment that is typically prone to malfunction and/or requiring a high degree of maintenance. For example, most existing solar steam generators cannot tolerate saline and impure water.

SUMMARY

Systems and methods relating to solar steam generation are described. These systems and methods use a solar steam generator that has a plug disposed in a closed top outer shell, which may define a small annular space between the plug and an interior of a transparent housing disposed atop the outer shell. Raw water is transferred into the outer shell of the solar steam generator, up into the small annular space between the plug and the interior of the transparent housing. Concentrated solar energy is directed at the transparent housing to boil raw water in the small annular space. Stray concentrated solar energy may be focused at the transparent housing to aid in boiling raw water in the small annular space. Steam rising from the small annular space is directed through a cavity extending from a top of the plug, downward through a steam outlet pipe, out of the solar steam generator.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In the Figures, the left-most digit of a component reference number identifies the particular Figure in which the component first appears.

FIG. 3 is a generally cross-sectional fragmented diagrammatic side view, taken generally along line 3-3 of FIG. 1, showing disposition of internal components the example solar steam generator therein, according to one embodiment.

FIG. 4 is an enlarged view of the plug of the generally cross-sectional fragmented diagrammatic side view of the example solar steam generator of FIG. 3, according to one embodiment.

DETAILED DESCRIPTION

Overview

Figure 1:
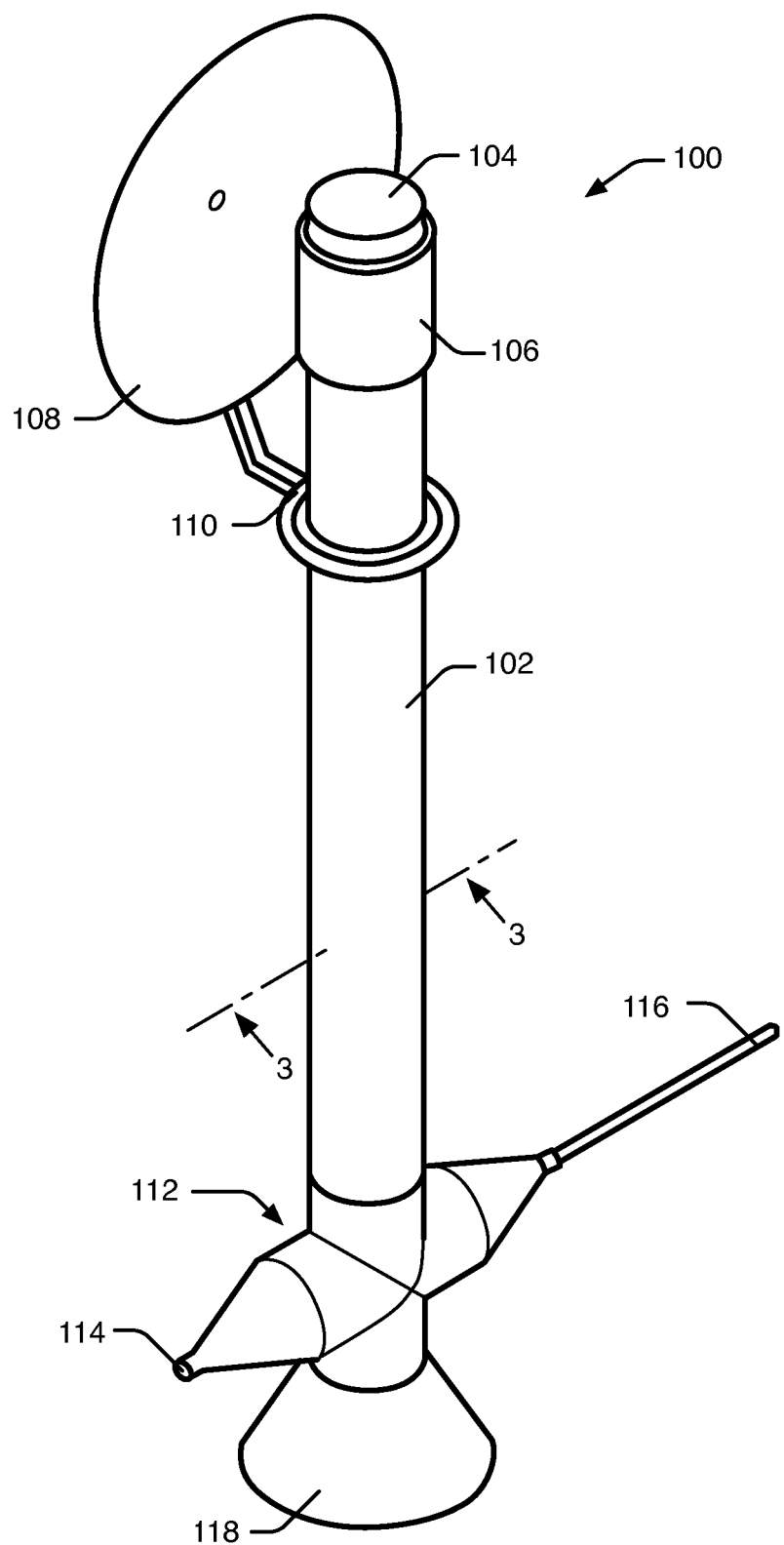
FIG. 1 is a perspective view of an example solar steam generator, according to one embodiment.

The systems and methods described herein relate to steam generation, such as may be used for desalination and distillation of water, namely to a solar steam generator, which can be used for gaining steam and distilled water out of impure water, using concentrated solar energy. Advantages of the present systems and methods include straightforwardness of design, easy maintenance, easy assembly and disassembly, and low cost. As noted, most existing solar steam generators cannot generally tolerate saline and impure water; also, they typically have low efficiency and high cost. Conversely, the present systems and methods produce steam and subsequently distilled water from impure and saline water in a generally straightforward and economical manner.

In accordance with various implementations of the present systems and methods, raw water is pumped to enter an outer shell of an embodiment of the present solar steam generator. In the outer shell, the raw water may be mixed with an anti-scalant and with a dye that may aid absorption of concentrated solar energy by the liquid mixture in a transparent double-layered housing disposed atop the outer shell. Both the transparent housing and outer shell may be cylindrical. In accordance with various implementations, concentrated solar energy may be provided to the system from a mirror field, heliostat, or the like and may impinge upon the transparent upper housing of the present solar steam generator from two directions, so that the whole glass housing may be heated with concentrated solar energy. One direction, the main focus, is provided by the aforementioned concentrated solar energy source, a mirror field, heliostat, or the like. A secondary focus may come from a parabolic reflector or the like, that may be rotatable, focusing back stray concentrated solar energy from the solar concentrator.

Inside the outer shell, a plug is disposed to assist boiling the liquid mixture. The plug may be rotated to help stabilize boiling. The plug defines a small clearance between it and the cylindrical wall of the transparent (glass) housing, so the amount of the water to be boiled is reduced. The plug has a conical cavity at its top, such that steam rising from boiling water between the plug and the cylindrical wall of the glass housing is directed down this cavity and into a steam pipe that exits the solar steam generator. If this steam is allowed to cool it will condense to distilled water.

Salts in the raw water are not allowed to crystallize because of the presence of the anti-scalant. However, the plug may be rotated to help remove any attached salts. In accordance with various implementations, crystallized salts precipitate at the bottom of the solar steam generator unit, such as in a base, where they can be separated from the liquid mix, which may be recycled, such as by way of example when the sun goes down.

Particular examples discussed herein are described generically, with reference to "distillation" of water. However, the present systems and methods are intended for use in any sort of purification of water including, but not limited to, desalination and/or the like.

Also, specific examples discussed herein condense the generated steam to provide distilled water. However, the steam may be used as a heat source for other processes, such as power generation, heating, or the like. As a further alternative, the steam may be used as low-grade steam for use in further, or alternative, water distillation systems. For example, the steam may be used to heat raw water, which may result in cooling and condensing the steam, while aiding in distillation of this heated raw water.

An Exemplary Solar Steam Generator

FIG. 1 is a perspective view of example solar steam generator 100, according to one embodiment. Solar steam generator 100 comprises closed top outer tubular shell 102. In accordance with the illustrated implementation outer tubular shell 102 is generally cylindrical and cap 104 defines the closed top of solar steam generator outer tubular shell 102. Transparent housing 106 is disposed above, that is atop, outer tubular shell 102. In accordance with various implementations, transparent housing 106 may be made of glass, may be cylindrical, and/or double walled, defining an air gap or a vacuum gap, between the walls to aid in retaining heat in solar steam generator 100.

Secondary solar energy-focusing mirror 108 may be deployed to focus stray solar energy on the transparent housing 106. In accordance with various implementations, secondary solar energy-focusing mirror 108 is parabolic to facilitate focusing stray solar energy on the transparent housing. Additionally or alternatively, secondary solar energy-focusing mirror 108 may be rotatable, such as around a central axis of solar steam generator 100. To facilitate rotation of secondary solar energy-focusing mirror 108 around a central axis of solar steam generator 100, secondary solar energy-focusing mirror 108 may be mounted on bracket 110.

Illustrated solar steam generator 100 employs base 112 supporting outer tubular shell 102, and hence transparent housing 106 there atop. Base 112 may accommodate raw water inlet 114, which is in fluid flow communication with the interior of outer tubular shell 102. Base 112 may also accommodate an outlet of steam outlet pipe 116. The lower portion of base 112 may define precipitate collection reservoir 118.

Figure 2:
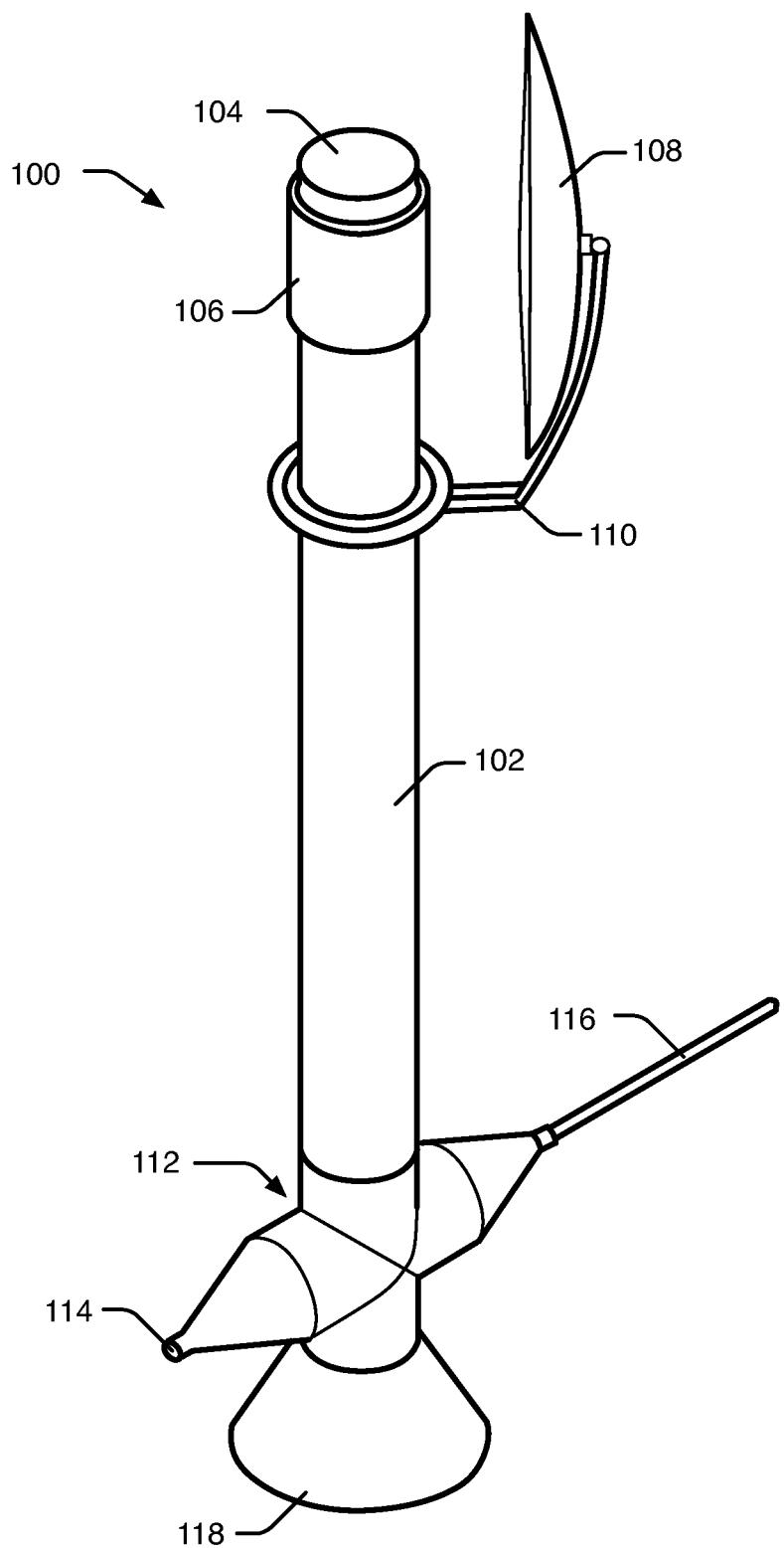
FIG. 2 is a perspective view of the example solar steam generator of FIG. 1, showing the parabolic secondary solar energy-focusing mirror rotated to a moved position, according to one embodiment.

FIG. 2 is a perspective view of example solar steam generator 100 of FIG. 1, showing parabolic secondary solar energy-focusing mirror 108, rotated to a moved position, according to one embodiment. As discussed above, secondary solar energy-focusing mirror 108 is rotated around a central axis of solar steam generator 100 on bracket 110.

FIG. 3 is a generally cross-sectional fragmented diagrammatic side view, taken generally along line 3-3 of FIG. 1, showing disposition of internal components example solar steam generator 100, according to one embodiment. For example, FIG. 3 shows plug 302 disposed in outer tubular shell 102, defining small clearance 304 between plug 302 and cylindrical transparent housing 106. Illustrated plug 302 comprises generally cylindrical upper portion 306, defining small clearance 304 between this generally cylindrical upper portion 306 of plug 302 and cylindrical transparent housing 106. A level of raw water transferred into outer shell 102 solar steam generator 100 rises up into small annular space 304, such that concentrated solar energy directed at transparent housing 106 boils the reduced amount of raw water in small annular space 304. In various implementations, the material of plug 302 is made from rust and corrosion resistant materials (e.g., stainless steel, or even high temperature resistant plastics or silicones). If plug 302 is allowed to be rotated (e.g., by a motor on the top (not shown)), then it is held in place by a bearing. Otherwise, if it is fixed, then it is fixed to the steam tube.

Plug 302 also defines central cavity 308, illustrated as conical, extending downward from a top of plug 302. Distilled steam outlet pipe 116 is shown extending from cavity 308, downward, out of solar steam generator 100, such as out through base 112 in FIG. 3. Due to the closed top of outer tubular shell 102, such as provided by cap 104, steam rising from the small annular space may be directed into cavity 308, downward through steam outlet pipe 116, out of solar steam generator 100.

In accordance with various implementations, plug 302 is rotatable within outer tubular shell 102 and transparent housing 106 to remove any attached salts or solids and/or to stabilize boiling. Also, FIG. 3 shows precipitate solids outlet 310 defined in bottom 312 of precipitate collection reservoir 118.

FIG. 4 is an enlarged view of plug 320 of the generally cross-sectional fragmented diagrammatic side view of example solar steam generator 100 of FIG. 3, according to one embodiment. As discussed above, illustrated plug 302 comprises generally cylindrical upper portion 306, which defines small clearance 304 between this generally cylindrical upper portion 306 of plug 302 and cylindrical transparent housing 106, such as illustrated in FIG. 3 and discussed above. As also noted, plug 302 additionally defines central cavity 308, illustrated as conical, extending downward from top 402 of plug 302. As may be best seen in FIG. 4, plug 302 may have a generally conical lower portion 404 which defines passage 406 to receive distilled steam pipe 116.

Figure 5:
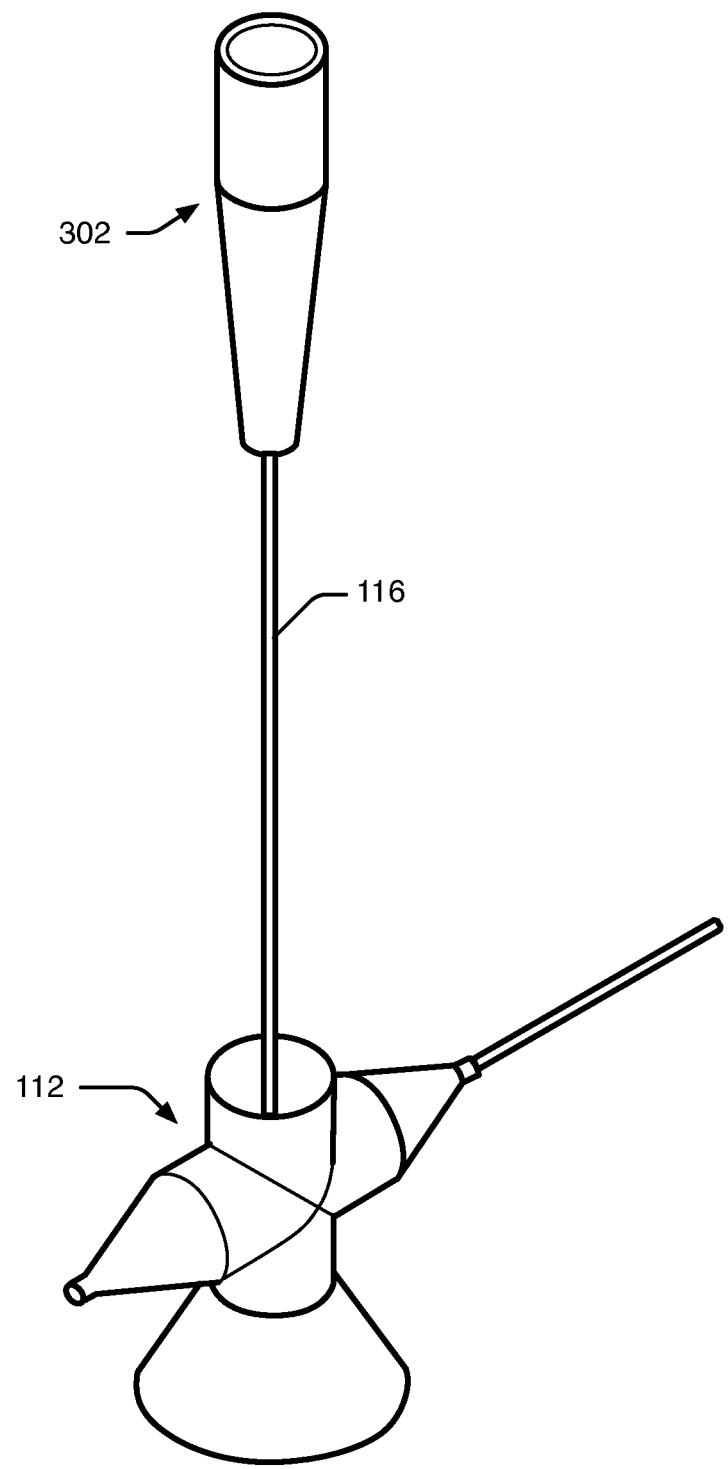
FIG. 5 is a perspective view of an assembled plug, steam outlet pipe and base of the example solar steam generator of FIG. 1, according to one embodiment.
Figure 6:
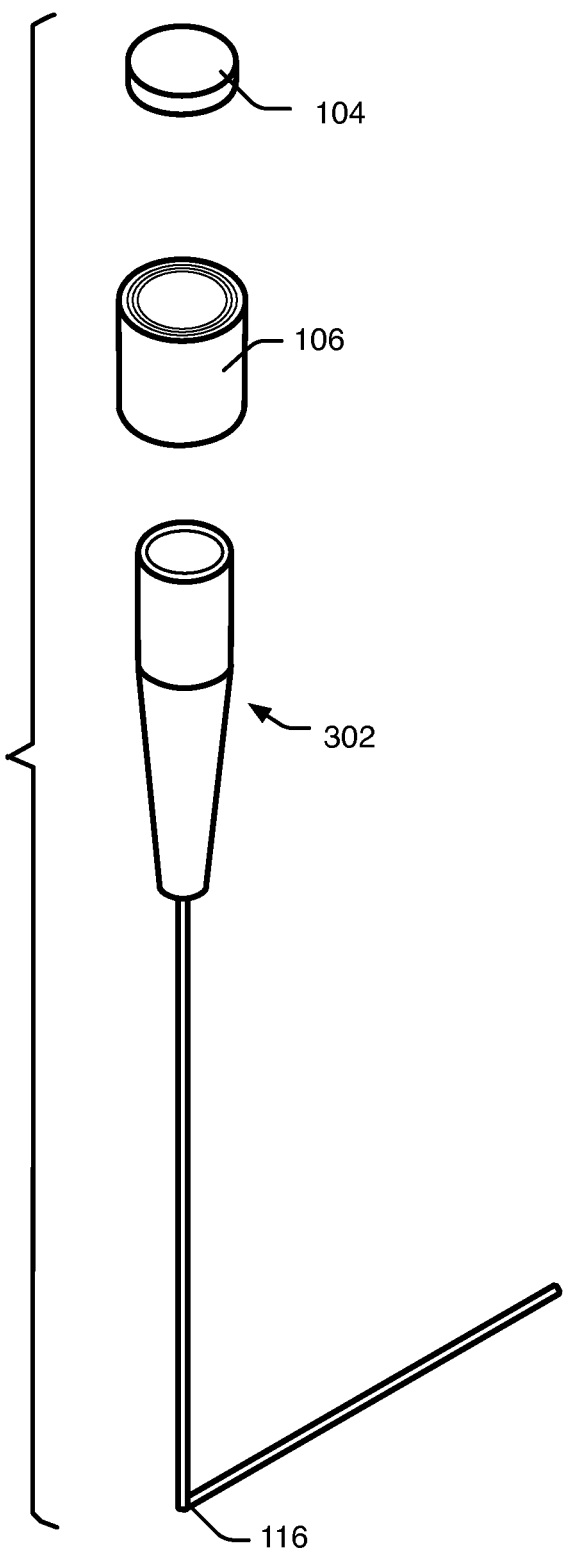
FIG. 6 is an exploded perspective view of a cap, transparent double walled cylindrical housing, plug, and steam outlet pipe of the example solar steam generator of FIG. 1, according to one embodiment.

Providing further clarity of the relationship of components of example solar steam generator 100, FIG. 5 is a perspective view of an assembled plug 302, steam outlet pipe 116 and base 112 of example solar steam generator 100 of FIG. 1, according to one embodiment. Similarly, FIG. 6 is an exploded perspective view of cap 104, cylindrical transparent double walled housing 106, plug 302, and steam outlet pipe 116 of example solar steam generator 100 of FIG. 1, according to one embodiment.

An Exemplary Water Distillation Procedure

Figure 7:
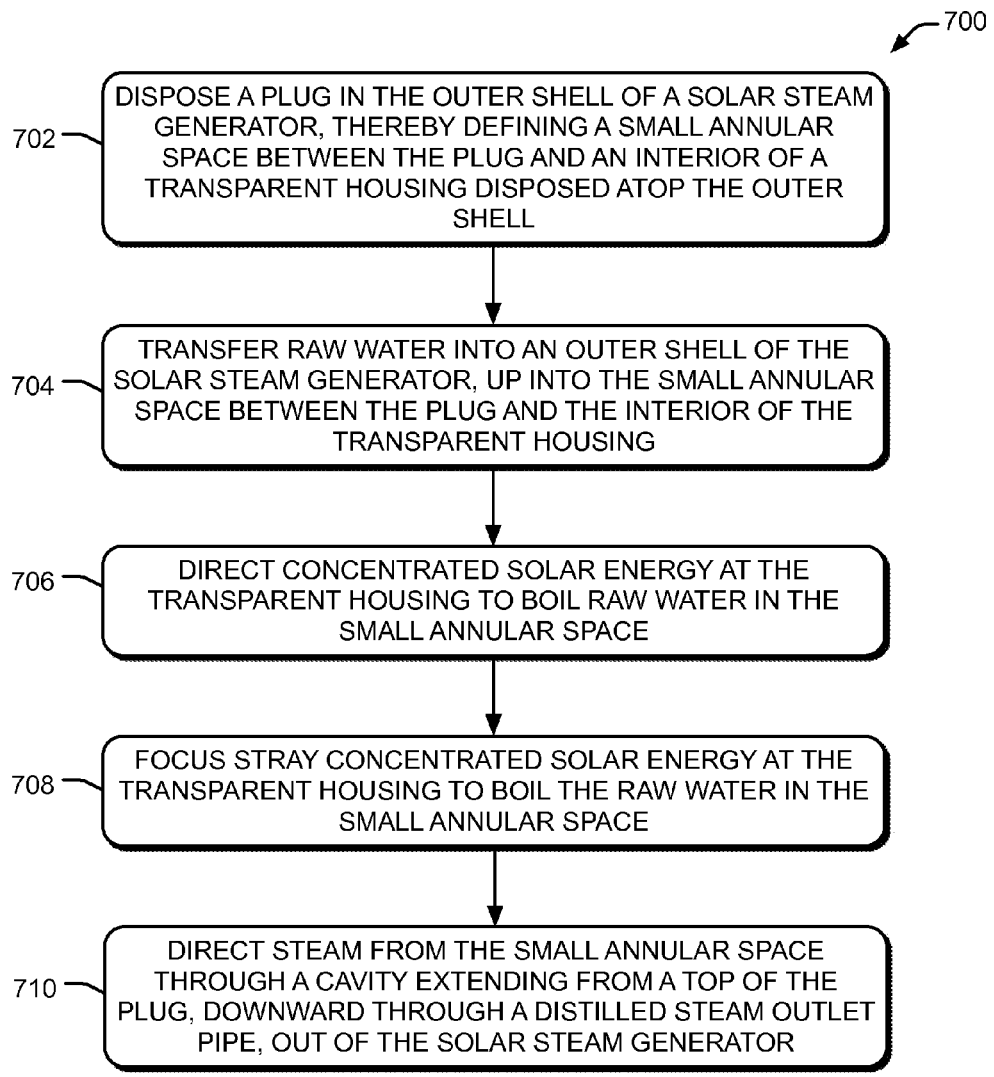
FIG. 7 shows an example procedure for solar steam generation, according to one embodiment.

FIG. 7 shows example procedure 700 for solar steam generation, according to one embodiment, such as may be carried out employing solar steam generator 100, described above. At 702, procedure 700 for solar steam generation calls for disposing the plug (302) in the outer shell (102) of a solar steam generator (100). This disposition of the plug defines a small annular space (304) between the plug and an interior of a transparent housing (106) disposed atop the outer shell, thereby assisting and stabilizing boiling of raw water inside the solar steam generator, as discussed below. As noted above, the transparent housing may be cylindrical and the plug may be rotatable to remove any attached salts or solids.

At 704, raw water is transferred, such as by pumping, into the outer shell of the solar steam generator, up into the small annular space between the plug and the interior of the transparent housing. The raw water may be mixed with anti-scalant(s) and a dye. The anti-scalant(s) are used to prevent crystallization of salts in the raw water and the dye is used to promote absorption of solar energy.

Concentrated solar energy, such as from a mirror field or heliostat is directed at the transparent housing at 706 to boil raw water in the small annular space. To further assist in boiling the raw water in the small annular space, stray concentrated solar energy may be focused on the transparent housing at 708. This focusing of stray concentrated solar energy at the transparent housing may be provided by a parabolic reflector reflecting and focusing the stray concentrated solar energy on the transparent housing.

At 710, steam rising from the small annular space is directed through a cavity (308) extending from a top of the plug, downward through a distilled steam outlet pipe (116), out of the solar steam generator. This cavity may be generally conical in shape, larger near the top of the plug, tapered down to the steam outlet pipe. Once outside the solar steam generator, this steam may be cooled, condensing the steam into distilled water. Salts from the raw water may be precipitated to a bottom of the solar steam generator and thereby separated from the liquid mix.

Conclusion

Although systems and methods for solar steam generation have been described in language specific to structural features and/or methodological operations or actions, it is understood that the implementations defined in the appended claims are not necessarily limited to the specific features or actions described. Rather, the specific features and operations of solar steam generation are disclosed as exemplary forms of implementing the claimed subject matter.

The invention claimed is:

1. A solar steam generator comprising:
   a closed top transparent outer tubular shell;
   a transparent housing disposed atop the outer tubular shell, receiving concentrated solar energy to boil raw water therein;
   a secondary solar energy-focusing minor, focusing stray concentrated solar energy on the transparent housing;
   a plug disposed in the transparent outer tubular shell defining a small clearance between the cylindrical upper portion of the plug and the transparent outer tubular shell and wherein said plug has a steam receptive conical cavity at its top and extending downward from the top of the plug such that steam rising from boiling water between the plug and the transparent outer tubular shell is directed down and into a steam pipe that exits the solar steam generator;
   a raw water inlet in fluid flow communication with an interior of the outer tubular shell; and
   a steam outlet pipe extending from the cavity, out of the solar steam generator.

2. The solar steam generator of claim 1, further comprising a small annular raw water boiling space defined between the plug and the transparent housing.

3. The solar steam generator of claim 1 wherein the secondary solar energy-focusing minor is parabolic.

4. The solar steam generator of claim 1, further comprising a precipitate solids outlet defined in a bottom of the solar steam generator.

5. The solar steam generator of claim 1, further comprising a base supporting the outer tubular shell, the base comprising the raw water inlet and a precipitate collection reservoir defining a precipitate solids outlet defined in a bottom of the precipitate collection reservoir.

6. The solar steam generator of claim 1 wherein the outer tubular shell and transparent housing are cylindrical.

7. A method for a solar steam generator comprising:
   providing a plug having a steam receptive conical cavity at its top and extending downwardly from the top of the plug;
   disposing the plug in a closed top outer shell of a solar steam generator, defining a small annular space along the length of the plug and an interior of a transparent housing disposed atop the outer shell;
   transferring raw water into the outer shell of the solar steam generator, up into the small annular space between the plug and the interior of the transparent housing;
   directing concentrated solar energy at the transparent housing to boil raw water in the small annular space;
   focusing stray concentrated solar energy at the transparent housing to aid in boiling raw water in the small annular space;
   directing steam rising from the small annular space, through the steam receptive conical cavity extending from the top of the plug, downward through a steam outlet pipe, out of the solar steam generator; and
   further comprising mixing the raw water with an anti-scalant and a dye, the anti-scalant preventing crystallization of salts in the raw water and the dye promoting absorption of solar energy.

8. The method of claim 7 wherein the focusing of stray concentrated solar energy at the transparent housing is provided by a parabolic reflector reflecting and focusing the stray concentrated solar energy on the transparent housing.

9. The method of claim 7, further comprising rotating the plug, removing any attached salts or solids.

10. The method of claim 7, further comprising cooling the steam outside the solar steam generator, condensing the steam into distilled water.

11. The method of claim 7, further comprising precipitating salts from the raw water at a bottom of the solar steam generator and separating the precipitated salts from the liquid mix.

* * * * *